No. 648,260. Patented Apr. 24, 1900.
P. S. HOLUM.
TRANSPLANTER.
(Application filed Aug. 11, 1898.)
(No Model.) 3 Sheets—Sheet 1.
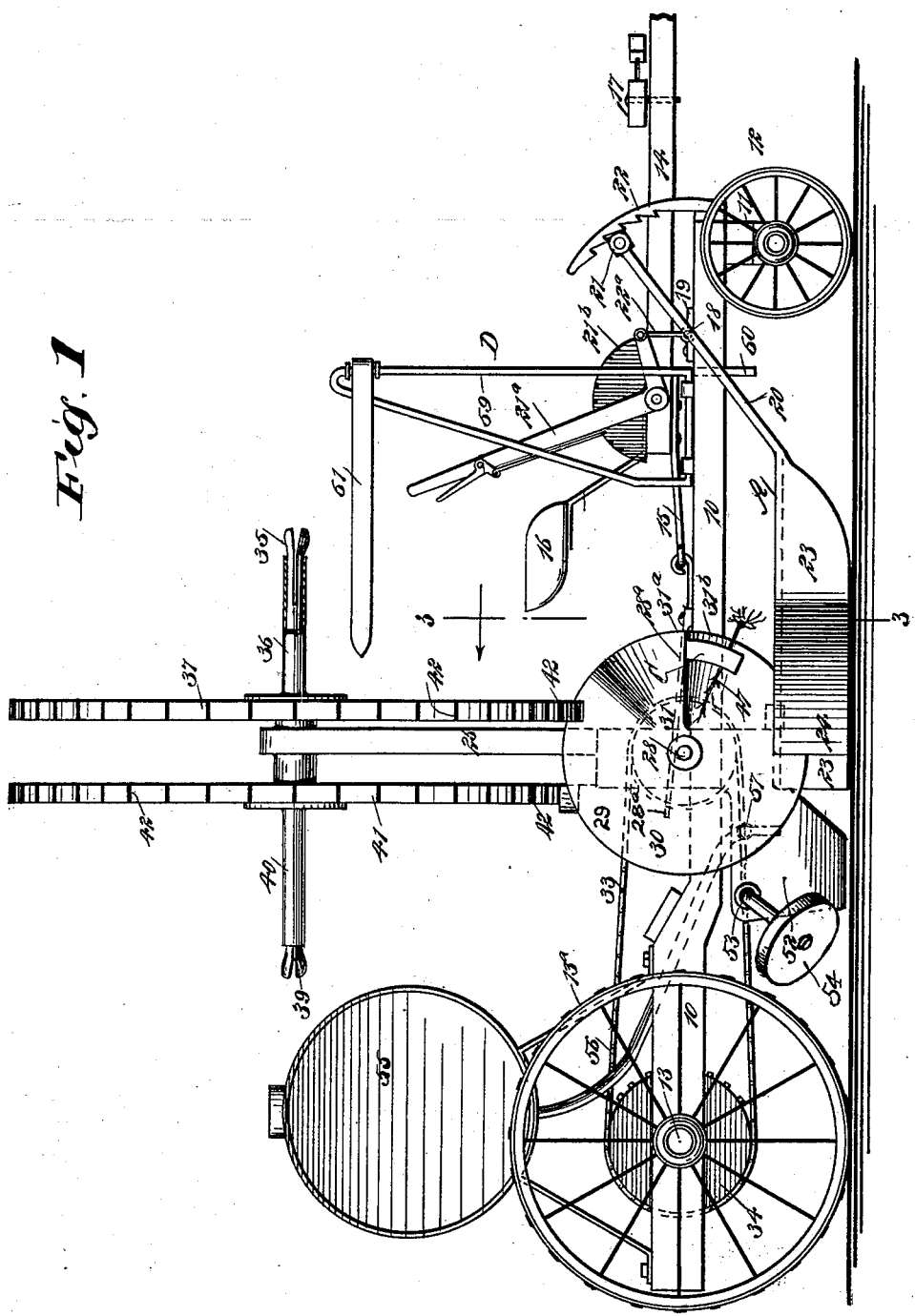
WITNESSES:
INVENTOR
BY
ATTORNEYS.

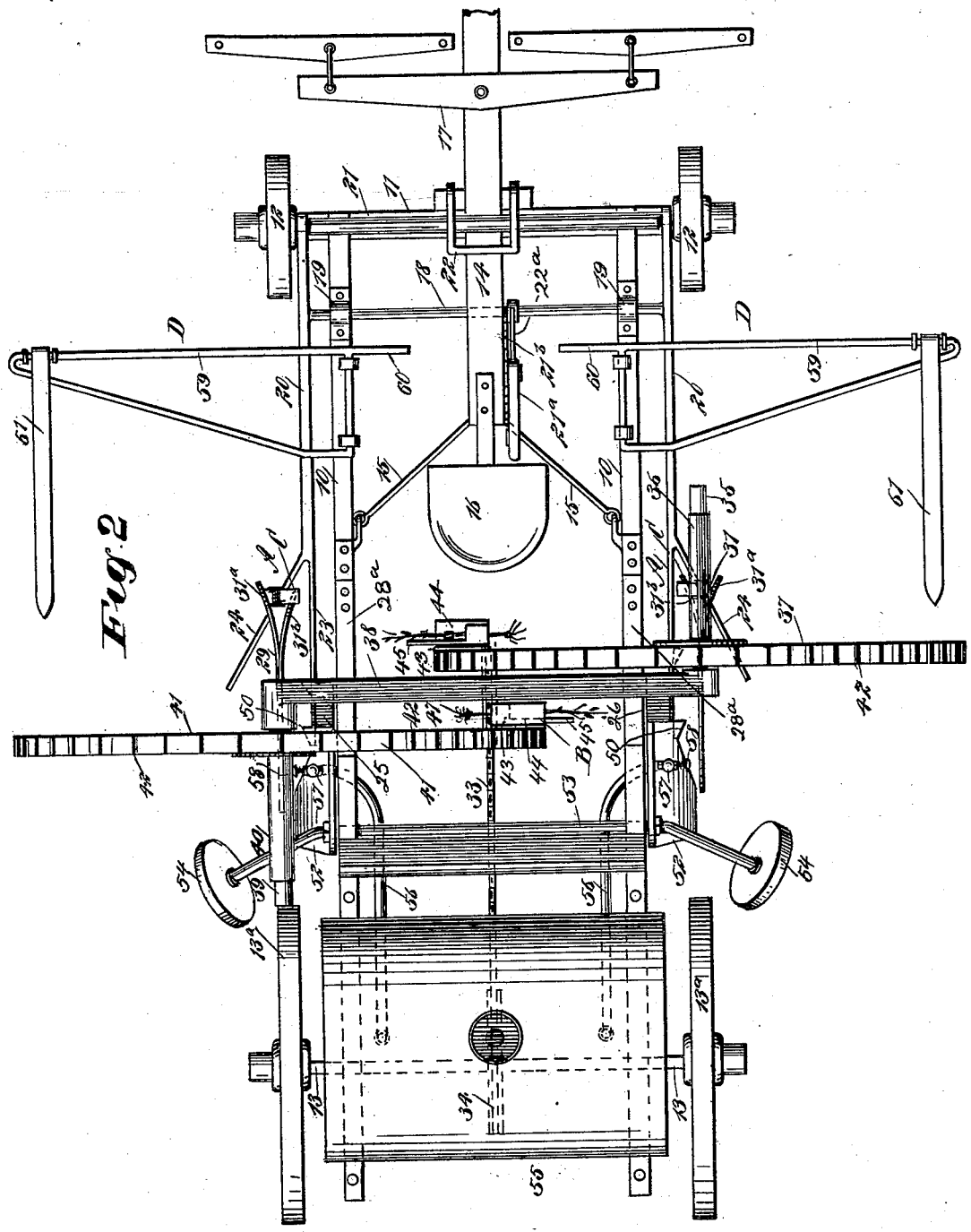

No. 648,260. Patented Apr. 24, 1900.
P. S. HOLUM.
TRANSPLANTER.
(Application filed Aug. 11, 1898.)
(No Model.) 3 Sheets—Sheet 3.

WITNESSES:
INVENTOR
P. S. Holum
BY
ATTORNEYS.

UNITED STATES PATENT OFFICE.

PETER S. HOLUM, OF DE FOREST, WISCONSIN.

TRANSPLANTER.

SPECIFICATION forming part of Letters Patent No. 648,260, dated April 24, 1900.

Application filed August 11, 1898. Serial No. 688,342. (No model.)

*To all whom it may concern:*

Be it known that I, PETER S. HOLUM, of De Forest, in the county of Dane and State of Wisconsin, have invented a new and useful Improvement in Transplanters, of which the following is a full, clear, and exact description.

One object of my invention is to construct a machine particularly adapted for transplanting tobacco, cabbage, or other plants and to so construct the machine that it will be exceedingly simple, durable, and economic.

A further object of the invention is to so construct a wheel-supported transplanter that the plants to be transported may be placed in position on the machine and held in position until required and whereby the action of the machine will be automatic to the extent that the plants will be taken from the retaining or carrying device provided for them and set in the ground and watered without the aid of an attendant.

A further object of the invention is to provide a means whereby all of the transplanting mechanism may be quickly and expeditiously raised from or lowered to the ground, and whereby, further, the entire machine will be under the complete control of the driver.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 4:
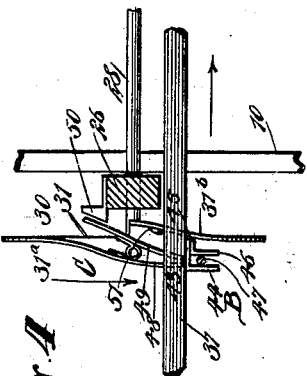
Figure 5:
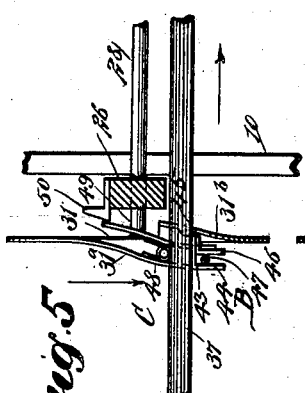
Figure 6:
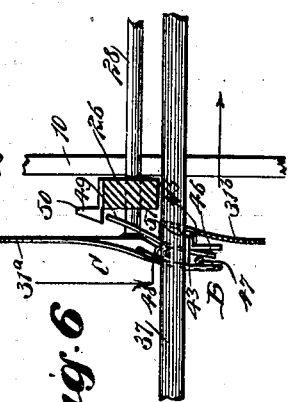
Figure 3:
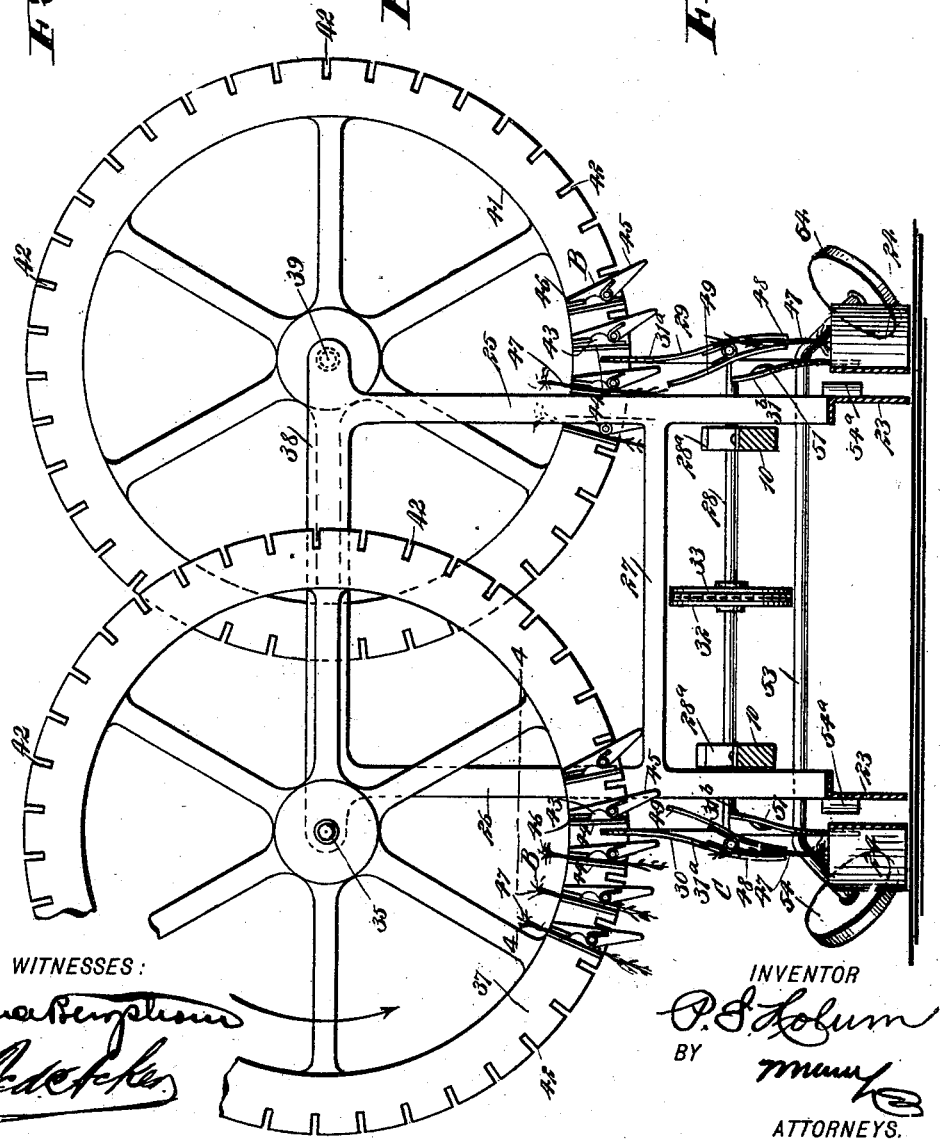

Figure 1 is a view of the right-hand side of the machine, a portion of the machine being in section and the plant-holding clamps omitted. Fig. 2 is a plan view of the machine. Fig. 3 is a transverse vertical section taken substantially on the line 3 3 of Fig. 1. Fig. 4 is a detail section through the lower portion of the forward plant-carrying wheel, the section being practically on the line 4 4 of Fig. 3, illustrating the combined transplanting and feed wheel in plan view, Fig. 4 being also designed to illustrate the position of the clamp carried by the transplanting and feed wheel when said clamp approaches the plant-carrying wheel. Fig. 5 is a view similar to Fig. 4, illustrating the clamp on the transplanting and feed wheel in position to receive a plant from the carrying-wheel; and Fig. 6 is a view similar to Figs. 4 and 5, illustrating the clamp carried by the transplanting and feed wheel as engaging with the plant, the plant having been withdrawn from the carrying-wheel.

The frame of the machine usually consists of parallel side beams 10, attached at their forward ends to the front axle 11, provided with supporting-wheels 12. The rear ends of the side beams of the frame are supported upon a rear axle 13, carrying ground or supporting wheels $13^a$. The tongue or pole 14 is usually provided with diverging arms 15 at its rear, the said arms being coupled to the side beams of the frame, as illustrated in Fig. 2. The driver's seat 16 is supported upon the rear portion of the tongue or pole 14, and said tongue or pole is provided, further, with the usual doubletrees 17.

Near the forward end of the frame a shaft 18 is journaled in bearings 19, and a link $22^a$ is connected with the central portion of the shaft 18, which link is also connected with an angle-lever $21^a$, pivoted on the tongue 14, the lever being provided with a suitable thumb-latch for engagement with a rack $21^b$, as shown in Fig. 1. Through the medium of the lever $21^a$ all the vertically-movable parts of the machine are lifted, including the shoes and rollers, to be hereinafter described. When these parts are thus lifted, the weight of the machine will rest upon the rear wheels and pole and upon the necks of the horses. The machine is thus raised when turning around in the field or when on the road.

Arms 20 are connected to the shaft 18 outside of the frame, one at each side, which arms extend downwardly and rearwardly, being connected at their upper ends or above the tongue or pole by a bar 21, usually polygonal in cross-section. This bar is adapted for engagement with the teeth of a rack 22, the rack being formed by a bar bent into a loop and rearwardly curved. The members of the rack are located one at each side of the pole or tongue, forming a guide therefor, and are secured to the forward axle or like support. Each arm 20 at its lower end is connected with a shoe A, the said shoes serving also as runners, being adapted to normally travel upon the ground and receive a plant to be planted. Each shoe consists of a straight inner member 23 and a second member 24, which extends outwardly and rearwardly at an angle from the inner member, as is shown best in Fig. 2. The rack 22 is employed only to set and hold the shoes out of the ground when desired.

Uprights 25 and 26 are secured at their lower ends to the rear portions of the inner members 23 of the shoes, the uprights being connected above the frame by a cross-bar 27 and at the top by a cross-bar 38, the latter cross-bar extending beyond the outer side faces of the uprights, as illustrated in Fig. 3. A shaft 28 is journaled in the uprights 25 and 26 at a point just above the frame, and the shaft 28 extends beyond the side portions of the frame, one end of the shaft having a combined transplanting and feed wheel 29 attached thereto, while a similar wheel 30 is secured to the opposite end of the shaft. The combined transplanting and feed wheels are alike in construction. Each wheel is split from its periphery in direction of its center, the splits in the wheels being designated by the reference-numeral 31, and each wheel at its split portion is bent laterally in opposite directions, forming on each wheel an outwardly-extending member $31^a$ and an inwardly-extending member $31^b$, as shown in Figs. 2, 3, 4, 5, and 6.

A suitable pulley 32 is located on the shaft 28, which pulley is connected by a driving-belt 33 with the pulley 34, secured on the rear axle 13 of the machine, as shown in Figs. 1 and 2. Any suitable shifting device is employed in connection with the pulleys 32 and 34, so that the plant-holding wheels may be held from turning while the machine is in motion. At the right-hand side of the machine a horizontal fixed spindle 35 is forwardly projected from the right-hand extension of the upper cross-bar 38, connecting the standards or uprights 25 and 26. This spindle 35 is of a spring character and is adapted to receive the hub 36 of a plant-carrying wheel 37. At the left-hand extension of the cross-bar 38 a horizontal rearwardly-extending spring-spindle 39 is secured, which receives the hub 40 of a second plant-carrying wheel 41. The plant-carrying wheel 37 is mounted to revolve across and over the right-hand transplanting and feed wheel 30, and the plant-carrying wheel 41 is mounted to revolve in like manner over the left-hand combined transplanting and feed wheel 29, as illustrated in Figs. 2 and 3. A series of slots 42 is made in the periphery of each of the plant-carrying wheels, the said slots being adapted to receive the peripheral portions of the transplanting and feed wheels 30. By reason of the deflection of a portion of each transplanting and feed wheel the wheel is given somewhat of a spiral shape at a portion of its periphery, so that as the feed and transplanting wheels enter the slots in the plant-carrying wheels and said transplanting and feed wheels are revolved they will impart rotary movement to the plant-carrying wheels, and the extent of the movement of the plant-carrying wheel will be the distance between two adjoining slots 42 during a complete revolution of the feed-wheel.

Clamps B are secured to the front faces of both of the plant-carrying wheels between the slots 42. These clamps may be of any desired shape. As shown, they comprise a jaw 43, fixed securely to the plant-carrying wheel and extending from the outer to the inner peripheral line thereof, each fixed jaw 43 being provided with a flange 44, against which the flanged head 46 of the second and pivoted member 45 of the clamp is adapted normally to have bearing through the medium of a suitable spring, the pivoted members 45 of the clamps B extending beyond the slotted periphery of the plant-carrying wheels. The plants 47 to be planted are held between the members of the clamps, the roots of the plants facing in direction of the axes of the wheels, as shown best in Fig. 3.

A clamp C is secured to the outwardly-deflected member $31^a$ of each of the combined feed and transplanting wheels. One member 48 of each clamp C is rigid and virtually forms a continuation of the diametrical edge of the member $31^a$ of the transplanting and feed wheel to which it is secured. The other member 49 of the clamp is spring-controlled, and the spring employed normally serves to hold the jaws of the two members of the clamp together, as shown in Fig. 4. The clamps C of the combined transplanting and feed wheels are opened when the clamps are designed to receive the plants by bringing the rear ends of the pivoted members of the said clamps in engagement with offsets or lugs 50, located on the uprights 25 and 26 or on the inner members 23 of the shoes A, where said members connect with said uprights, as shown in Figs. 3, 4, 5, and 6. Preferably the outer faces of the offsets or lugs 50 are inclined, and upon the inner face of the inner member $31^b$ of each transplanting and feed wheel a projection 51 is formed, which projections as the feeding and transplanting wheels revolve are adapted to engage with the projecting or handle ends of the pivoted members of the clamps on the plant-carrying wheel from which the plant is to be taken, thus causing a release of a particular plant on the plant-carrying wheel, which plant is to be received and held by the clamp on the feed and transplanting wheel in action.

A fender 52 is secured to the rear end of the inner member of each shoe A, which fenders are secured to the uprights 25 and 26 just above the rear ends of the shoes A. One of these fenders is clearly shown in Fig. 1, and the object of the fenders is to direct the earth to the shoes. A fixed shaft 53 is passed through the said fenders, the shaft being independent of the frame, and the ends of the shaft are outwardly and rearwardly inclined, and upon the inclined ends of the said shaft covering-wheels 54 are mounted to revolve, which have an inward inclination, being at an angle to the shoes and to the frame, and the angle at which the covering-wheels are set is such as will cause the said wheels to travel in a path that will be about central between and longitudinal of the members of the shoe, and these wheels 54 after the plant has been deposited within the rear portion of the shoe and the root placed in the ground will gather dirt around the plants. The plants are released from the clamps on the feed and transplanting wheels by the rear ends of the free members of the clamps engaging with offsets 54$^a$, located upon the outer faces of the inner members of the shoes, as illustrated in Fig. 3.

A tank 55 is supported upon the rear portion of the frame, which tank is adapted to contain water, and a hose 56 is led from each end portion of the tank outward through the fenders 52, terminating in a cock 57, opened and closed by a spring-plug 58 of any desired construction, and after the plants have been placed in the ground the projections 51 on the feed and transplanting wheel will engage with the plugs 58, force the said plugs inward, and permit water to escape from the cocks to the ground, thus watering the plant. The moment that the projections on the transplanting-wheels pass the plugs 58 the plugs normally seat themselves.

Markers D are located at each side of the machine near the front. These markers preferably consist of skeleton frames 59, pivoted on the side beams of the main frame, each skeleton frame 59 being provided with an inwardly-extending member 60, and at the outer end of each marker-frame a marking-arm 61 is located, the marking-arms extending rearward parallel with the sides of the main frame of the machine. When the markers are not in use, they may be carried to a vertical position without the necessity of the driver leaving his seat, it being simply necessary for the driver to press downward upon the inwardly-extending members 60 of said markers.

In operation the clamps of the plant-carrying wheels are supplied with plants before the machine is taken to the field where the transplanting is to be done, the roots of the plants facing the central portion of the carrying-wheels. The various working parts of the machine are now elevated by operating the lever 21$^a$, so that the machine can be conveniently taken to the field. When the field is reached, the frame and its attached parts are permitted to drop until the runners or shoes engage with the ground, whereupon the combined feed and transplanting wheels will be revolved, each turning in a slot in a carrying-wheel. As the clamps C of the transplanting and feed wheels approach the carrying-wheels and the jaws of the clamps pass beneath said carrying-wheels the said jaws will occupy the position shown in Fig. 4 and will be closed and will also be adjacent to one of the clips on the carrying-wheel. As the clamps C are carried farther forward their hinged members will engage with the offsets 50 and the jaws will be opened, as shown in Fig. 5, the jaws receiving between them the projecting or leaf portion of the plant. Just prior to the jaws of the clamps C closing—that is, just prior to the free members of the clamps leaving the offsets 50—the lugs or offsets 51 on the combined feed and transplanting wheels will engage with the pivoted member of the clamp B from which the plant is to be taken, and just as the clamps B are opened the clamps C will be closed and the plants received by them will be carried downward and delivered to the ground roots downward between the members of the shoes, as shown in Fig. 3. As soon as the root of a plant has entered into the ground the jaws of the clamp C will be opened by reason of their free members engaging with the offsets 54$^a$. (Shown in Fig. 3.) Immediately after the release of the plants the offsets or lugs 51 on the transplanting-wheel will open the valves or cocks on the water-supply tubes and permit water to be delivered to the plant. It will thus be observed that the machine is automatic in its action and that after the plants have been once placed in the carrying-wheels the driver of the machine need pay no attention to the delivery of the plants, enabling the driver to devote all attention to placing the plants in properly-defined rows. Springs 28$^a$ are attached to the sides of the frame and have bearing on the shaft 28 for the purpose of holding said shaft in its bearings.

Having thus described my invention, I claim as new and desire to secure by Letters Patent—

1. In a transplanting-machine, the combination, with a carrying-wheel provided with a series of spring-controlled clamps adapted to receive plants between their jaws, the carrying-wheel being provided with slots between the clamps, of a divided feed-wheel having a spiral formation, the periphery of the feed-wheel being adapted to enter the slots in the carrying-wheel, a spring-controlled clamp carried by the feed-wheel, adapted to take plants from the clamps on the carrying-wheel, a trip device located on the feed-wheel, adapted to open the jaws of the clamps on the carrying-wheel, and trip devices for the clamp on the feed-wheel, one trip device being located near the upper and the other near the lower edge of the said feed-wheel, for the purpose set forth.

2. In a transplanting-machine, the combination, with a carrying-wheel provided with a series of spring-controlled clamps adapted to receive plants between their jaws, the carrying-wheel being provided with slots between the clamps, of a divided feed-wheel having a spiral formation, the periphery of the feed-wheel being adapted to enter the slots in the carrying-wheel, a spring-controlled clamp carried by the feed-wheel, adapted to take plants from the clamps on the carrying-wheel, a trip device located on the feed-wheel, adapted to open the jaws of the clamps on the carrying-wheel, trip devices for the clamp on the feed-wheel, one trip device being located near the upper and the other near the lower edge of the said feed-wheel, shoes located beneath the said feed-wheels, and covering devices following the said shoes, for the purpose specified.

3. In a transplanting-machine, the combination, with a carrying-wheel provided with a series of spring-controlled clamps adapted to receive plants between their jaws, the carrying-wheel being provided with slots between the clamps, of a divided feed-wheel having a spiral formation, the periphery of the feed-wheel being adapted to enter the slots in the carrying-wheel, a spring-controlled clamp carried by the feed-wheel, adapted to take plants from the clamps on the carrying-wheel, a trip device located on the feed-wheel, adapted to open the jaws of the clamps on the carrying-wheel, trip devices for the clamp on the feed-wheel, one trip device being located near the upper and the other near the lower edge of the said feed-wheel, shoes located beneath the said feed-wheel, covering devices following the said shoes, and a watering device, the water-supply being carried to the said shoe, and means for turning on and turning off the water-supply through the medium of the feed-wheel, for the purpose set forth.

4. In a transplanting-machine, the combination, with a wheel-supported frame, shoes located at the sides of the said frame, standards carried by the said shoes, a shaft journaled in the said standards, means for driving the said shaft from the supporting-wheel of the machine, and combined feed and transplanting wheels secured to the said shafts above the shoes, each combined feed and transplanting wheel being provided with a slot extending from its periphery in direction of its center, the portions of the wheels adjacent to the said slots being carried laterally in opposite directions, and a spring-controlled clamp carried by the outwardly-extending members of the feed-wheel, of carrying-wheels supported by the said uprights, each carrying-wheel being provided with a series of peripheral slots adapted to receive the peripheral portion of a feed and transplanting wheel, spring-controlled clamps located upon the carrying-wheels, trips for the clamps on the carrying-wheels, located upon the combined feed and transplanting wheels, trip devices for the clamps on the combined feed and transplanting wheels, located near top and bottom of the said combined feed and transplanting wheels, and means, substantially as described, for raising and lowering the uprights and parts carried thereby, as specified.

5. In a transplanting-machine, the combination, with a wheel-supported frame, shoes located at the sides of the said frame, standards carried by the said shoes, a shaft journaled in the said standards, means for driving the said shaft from the supporting-wheels of the machine, and combined feed and transplanting wheels secured to the said shafts above the shoes, each combined feed and transplanting wheel being provided with a slot extending from its periphery in direction of its center, the portions of the wheels adjacent to the said slots being carried laterally in opposite directions, and a spring-controlled clamp carried by the feed-wheel, of carrying-wheels supported by the said uprights, each carrying-wheel being provided with a series of peripheral slots adapted to receive the peripheral portion of a feed and transplanting wheel, spring-controlled clamps located upon the carrying-wheels, trips for the clamps on the carrying-wheels, located upon the combined feed and transplanting wheels, trip devices for the clamps on the combined feed and transplanting wheels, located near the top and bottom of the said combined feed and transplanting wheels, means, substantially as shown and described, for raising and lowering the uprights and parts carried thereby, covering devices located at the rear of the said shoes, and a water-tank provided with tubes leading to the shoes, and with nozzles operated by the movement of the combined feed and transplanting wheels, as specified.

PETER S. HOLUM.

Witnesses:
O. S. HOLUM,
J. W. PARKER.